(12) United States Patent
Horiuchi

(10) Patent No.: US 9,178,231 B2
(45) Date of Patent: Nov. 3, 2015

(54) FUEL CELL SYSTEM AND FUEL CELL SYSTEM DIAGNOSIS METHOD

(75) Inventor: Kouichiro Horiuchi, Kariya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 58 days.

(21) Appl. No.: 13/993,953

(22) PCT Filed: Dec. 16, 2011

(86) PCT No.: PCT/IB2011/003229
§ 371 (c)(1),
(2), (4) Date: Jun. 13, 2013

(87) PCT Pub. No.: WO2012/085663
PCT Pub. Date: Jun. 28, 2012

(65) Prior Publication Data
US 2013/0260272 A1    Oct. 3, 2013

(30) Foreign Application Priority Data
Dec. 20, 2010    (JP) .................................. 2010-282983

(51) Int. Cl.
*H01M 8/04*    (2006.01)
*H01M 8/06*    (2006.01)

(52) U.S. Cl.
CPC ...... *H01M 8/04298* (2013.01); *H01M 8/04126* (2013.01); *H01M 8/04559* (2013.01); *H01M 8/04738* (2013.01); *H01M 8/04835* (2013.01); *H01M 8/0606* (2013.01); *H01M 8/0618* (2013.01); *Y02E 60/50* (2013.01)

(58) Field of Classification Search
CPC ..................................................... H01M 8/04
USPC ..................................... 429/432, 411, 416, 415
See application file for complete search history.

(56) References Cited

U.S. PATENT DOCUMENTS

| | | | |
|---|---|---|---|
| 4,812,373 A * | 3/1989 | Grimble et al. | 429/424 |
| 6,500,573 B1 * | 12/2002 | Simazu et al. | 429/413 |
| 2008/0124590 A1 * | 5/2008 | Ballantine et al. | 429/13 |
| 2008/0160361 A1 * | 7/2008 | Ohara et al. | 429/17 |
| 2010/0028732 A1 * | 2/2010 | Leah et al. | 429/14 |

FOREIGN PATENT DOCUMENTS

| | | |
|---|---|---|
| JP | 2008010260 A | 1/2008 |
| JP | 2008159466 A | 7/2008 |
| JP | 2008243594 A | 10/2008 |

* cited by examiner

*Primary Examiner* — Patrick Ryan
*Assistant Examiner* — Alex Usyatinsky
(74) *Attorney, Agent, or Firm* — Kenyon & Kenyon LLP

(57) ABSTRACT

A system has: a stack having anodes supplied with anode fluid and cathodes supplied with cathode fluid; an evaporating portion generating steam by evaporating water; a water deliverer delivering the water to the evaporating portion; and a reforming portion producing the anode fluid through steam-reforming on fuel using the steam generated by the evaporating portion. A controller executes a determination process that determines whether an open circuit voltage of the stack increases while the water is temporarily fed to the evaporating portion, when the stack is restarted from a state where power generation of the stack is suspended but the temperature of the evaporating portion is a reference temperature being capable of generating steam, and if the open circuit voltage has increased or is on an increase, the controller executes a restart process for resuming the power generation of the stack.

9 Claims, 5 Drawing Sheets

FUEL CELL SYSTEM AND FUEL CELL SYSTEM DIAGNOSIS METHOD

This is a 371 national phase application of PCT/IB2011/003229 filed 16 Dec. 2011, claiming priority to Japanese Patent Application No. 2010-282983 filed 20 Dec. 2010, the contents of which are incorporated herein by reference.

BACKGROUND OF THE INVENTION

1. Field of the Invention

The invention relates to a fuel cell system incorporating a steam generation system that has an evaporating portion for generating steam for fuel reforming from raw material water (water as a raw material), and relates to a fuel cell system diagnosis method.

2. Description of Related Art

Japanese Patent Application Publication No. 2008-243594 describes a technique of detecting generation of steam by feeding raw material water to an evaporating portion in a fuel cell system. According to this technique, generation of steam is detected based on a change in the temperature detected by a temperature sensor that is provided near a raw material water inlet of the evaporating portion. As steam is generated from the raw material water, the temperature of the ambient atmosphere decreases due to evaporation heat, and therefore generation of steam is detected based on such a decrease in the temperature of the ambient atmosphere. Further, in the fuel cell system described in Japanese Patent Application Publication No. 2008-159466, the feeding of raw material water is detected through a comparison between the control signals for a raw material water feed pump and the signals of a flow sensor that is provided midway in a water pipe.

According to the technique described in Japanese Patent Application Publication No. 2008-243594, if the evaporation heat of the raw material water is at a certain level or higher with respect to the thermal capacity of the evaporating portion, the temperature decreases as a result of generation of steam, and therefore the generation of steam can be detected. However, if only a small amount of the raw material water is fed and therefore the level of the evaporation heat is low, the generated steam causes only a small change in the temperature. In such a case, the generation of steam may not be detected properly. According to the technique described in Japanese Patent Application Publication No. 2008-159466, further, although it can be detected whether the raw material water in a liquid phase is fed to the evaporating portion, it is impossible to directly determine whether steam is being actually generated or has been actually generated. Thus, the technique described in Japanese Patent Application Publication No. 2008-159466 is unable to cope with possible abnormalities, such as the raw material water leaking out from a midway point of the pipe and an evaporation failure due to a local temperature decrease.

Accordingly, it is not easy to determine whether raw material water has been fed to an evaporating portion and steam has been generated. Thus, there is a possibility of a lack of steam at the reforming portion. If the fuel is fed to the reforming portion despite that the steam is not sufficient, coking may occur at the reforming portion, which is not desirable in terms of the life of the reforming portion, that is, the life of the fuel cell system. It is to be noted that "coking" represents that carbon derived from the fuel fed to the reforming portion deposits on the surface of the reforming catalyst in the reforming portion, and it results in a decrease in the life of the reforming catalyst.

SUMMARY OF THE INVENTION

The invention provides a fuel cell system and a fuel cell system diagnosis method that allow verifying that water has been fed to an evaporating portion and then steam has been generated, before starting or restarting the power generation of the fuel cell system, and thereby minimize the possibility of a lack of steam at a reforming portion, thus the possibility of coking at the reforming portion, resulting in a longer life of the reforming portion, that is, a longer life of the fuel cell system.

(1) The inventor has been devoting themselves to the development of fuel cell systems for years. As mentioned earlier, if a fuel cell system is operated while steam is not sufficient, coking may occur at a reforming portion. With regard to this, the inventor has found that feeding a sufficient amount of steam, obtained by evaporating water, to the reforming portion during the power generation of the fuel cell system (especially, in an initial period after the start-up of the fuel cell system) is effective to prevent coking at the reforming portion, and they have also found that checking in advance the steam generation function of a steam generation system including the evaporating portion, etc. is effective to ensure that a sufficient amount of steam, obtained by evaporating water, is fed to the reforming portion during the power generation of the fuel cell system.

In the meantime, even when the fuel cell system is not generating power, the temperature of the evaporating portion is a reference temperature being capable of generating the steam for a certain period of time from the discontinuance of the power generation of the fuel cell system. In view of this, the inventor has discovered that if the open circuit voltage (OCV) of the stack increases after water is temporarily fed to the evaporating portion in a state where the power generation of the fuel cell system is suspended but the temperature of the reforming portion is the reference temperature being capable of generating the steam, it indicates that the steam generation function of the steam generation system including the evaporating portion, etc. is normal, and the steam generation system is therefore capable of generating steam properly. Further, the inventor has discovered that detecting such a state of the steam generation system is effective to ensure proper power generation of the stack without a lack of steam, thus prevent coking, and thus prolong the life of the fuel cell system.

Although not yet sufficiently clear, the possible reasons of the above are as follows. When the power generation of the fuel cell system is suspended, basically, gasses other than hydrogen, such as air, remain in the anodes of the respective fuel cells of the stack. In such a state, the electric potential of the anodes is higher than 0 V (the standard electrode potential of hydrogen=0 V), and therefore the electric potential difference between the anodes and the cathodes in the stack is basically small. Therefore, the open circuit voltage (OCV) of the stack is basically low when the power generation of the fuel cell system is suspended. Meanwhile, although not yet verified enough, hydrogen remains in the material(s) of the reforming portion even when the power generation of the fuel cell system is suspended, and such residual hydrogen is especially likely to be present if the material is porous.

In the meantime, although not yet verified enough, if water is fed, before restarting the fuel cell system, to the evaporating portion of which the temperature is the reference temperature being capable of generating the steam, and therefore steam is properly generated by the evaporating portion, the generated steam flows into the reforming portion, located downstream of the evaporating portion, and then forces the residual hydrogen in the reforming portion out to the anodes in the stack, whereby the hydrogen concentration at the anodes in the stack increases, causing the electric potential of the anodes to decrease to be closer to the standard electrode potential of hydrogen (0 V), and thus resulting in an increase in the open circuit voltage (OCV) of the stack.

The open circuit voltage (OCV) is the voltage of the stack constituted of the fuel cells in a state where no external load is eclectically connected to the stack (i.e., a state where there is no current through the stack to the external load), that is, it is the electric potential difference between the cathodes (oxidant electrodes) and the anodes (fuel electrodes) in a state where no external load is electrically connected to the stack.

As mentioned earlier, the inventor has discovered that even when the power generation of the fuel cell system is suspended, the open circuit voltage (OCV) of the stack increases if the water is fed to the evaporating portion and thus steam is generated. In this case, it can be determined that the evaporating portion is in a normal condition and thus generates steam properly. As such, the inventor has found it possible to use such an increase in the open circuit voltage (OCV) of the stack that occurs in response to the water being fed while the power generation of the fuel cell system is suspended, as means or a criterion for checking the steam generation function of the steam generation system including the evaporating portion, etc. On the basis of this finding, therefore, the inventor has made the invention. According to the invention, the steam generation function of the steam generation system including the evaporating portion, etc., is determined as being normal if the open circuit voltage (OCV) of the stack has increased or is on an increase after the water was fed to the evaporating portion, and therefore the power generation of the stack can be resumed properly. According to the invention, as such, whether the steam generation function of the evaporating portion is normal can be determined in advance.

Although, depending upon the structure and configuration of the fuel cell system, "when the temperature of the evaporating portion is high enough to generate steam" refers, for example, to a case where the temperature of the evaporating portion is 80, 90, 100, 110, 150, 200, 250, or 300° C. or higher. However, it is to be understood that the evaporating portion generates steam even if its temperature is lower than 100° C. Further, in a case where the evaporating portion is disposed in a power generator module having a stack of fuel cells, a reforming portion, and a thermal insulation wall surrounding such components, "when the temperature of the evaporating portion is high enough to generate steam" refers, for example, to a case where the internal temperature of the power generator module (i.e., the temperature of the stack or the temperature of the reforming portion) is equal to or higher than a predetermined temperature that is, for example, 110° C. or higher. Under the atmospheric pressure, the predetermined temperature may be set to, for example, 90, 100, 110, 150, 200, 250, or 300° C. However, in view of the necessity of causing the evaporating portion to generate steam, preferably, the predetermined temperature is set relatively high. Further, a temperature sensor may be provided at the evaporating portion. In this case, the temperature detected directly by the temperature sensor (i.e., the temperature of the evaporating portion) may be compared with the predetermined temperature. Further, the internal temperature of the power generator module may be regarded as the temperature of the evaporating portion.

According to a form of the invention, a controller executes, before restarting a fuel cell system, a determination process in a state where the temperature of an evaporating portion is the reference temperature being capable of generating the steam, and restarts the fuel cell system if it is determined in the determination process that the steam generation function of the evaporating portion is normal. As such, since the evaporating portion is verified as being in a normal condition before restarting the fuel cell system, the power generation of the fuel cell system can be properly performed without any lack of steam at the reforming portion, and thus without causing coking at the reforming portion.

According to the above-described form of the invention, for example, after outputting a command for shutting the fuel cell system down, the controller executes the determination process on the condition that the temperature of the evaporating portion is high enough to generate steam. This arrangement provides the advantage that whether the steam generation system including evaporating portion, etc. is in a normal condition can be verified each time the operation of the fuel cell system is stopped.

(2) The first aspect of the invention relates to a fuel cell system. The fuel cell system is provided with: a stack of fuel cells each having an anode to which an anode fluid is fed and a cathode to which a cathode fluid is fed; a steam generation system that is provided with an evaporating portion for generating a steam by evaporating a water and a water feed passage having a water deliverer for delivering the water to the evaporating portion; a reforming portion that produces the anode fluid by performing steam-reforming on a fuel using the steam generated by the evaporating portion; and a controller. The controller executes a determination process that determines whether an open circuit voltage of the stack increases in a state where the water is fed to the evaporating portion while power generation of the stack is suspended but a temperature of the evaporating portion is the reference temperature being capable of generating the steam, and if it is determined in the determination process that the open circuit voltage of the stack has increased or is on an increase, the controller determines the steam generation system as being in a normal condition.

The second aspect of the invention relates to a fuel cell system diagnosis method for diagnosing a fuel cell system. The fuel cell system is provided with: a stack of fuel cells each having an anode to which an anode fluid is fed and a cathode to which a cathode fluid is fed; a steam generation system that is provided with an evaporating portion for generating a steam by evaporating a water and a water feed passage having a water deliverer for delivering the water to the evaporating portion; and a reforming portion that produces the anode fluid by performing steam-reforming on a fuel using the steam generated by the evaporating portion. The fuel cell system diagnosing method includes: executing a discontinuation process for discontinuing power generation of the stack; and executing, after the discontinuation process, a determination process that determines whether an open circuit voltage of the stack increases in a state where the water is fed to the evaporating portion while a temperature of the evaporating portion is the reference temperature being capable of generating the steam; and determining the steam generation system as being in a normal condition if it is determined in the determination process that the open circuit voltage of the stack has increased or is on an increase.

The fuel cell system according to the first aspect of the invention and the fuel cell system diagnosis method according to the second aspect of the invention may each be such that the determination process is executed while feeding the cathode fluid to the cathodes in the stack.

The fuel cell system according to the first aspect of the invention and the fuel cell system diagnosis method according to the second aspect of the invention may each be such that the fuel cell system is restarted after the steam generation system is determined as being in the normal condition in the determination process.

The fuel cell system according to the first aspect of the invention and the fuel cell system diagnosis method according to the second aspect of the invention may each be such that the determination process is executed when the temperature of the evaporating portion is the reference temperature being capable of generating the steam after a command for discontinuing power generation of the fuel cell system is output.

The fuel cell system according to the first aspect of the invention and the fuel cell system diagnosis method according to the second aspect of the invention may each be such that in the determination process, the open circuit voltage of the stack is determined as having increased or as being on an increase if a rate of increase in the open circuit voltage of the stack is equal to or higher than a predetermined value.

The fuel cell system according to the first aspect of the invention and the fuel cell system diagnosis method according to the second aspect of the invention may each be such that in the determination process, the open circuit voltage of the stack is determined as having increased or as being on an increase, if the open circuit voltage decreases.

The fuel cell system according to the first aspect of the invention and the fuel cell system diagnosis method according to the second aspect of the invention may each be such that in the determination process, the higher the temperature of the evaporating portion is, the larger an amount of the water to be fed to the evaporating portion is made.

In the meantime, for example, after the power generation of the stack is discontinued, the temperature of the reforming portion gradually decreases. When required, the controller restarts the fuel cell system from a state where the power generation of the stack is suspended. If the temperature of the evaporating portion is the reference temperature being capable of generating the steam when the stack is to be restarted as described above, the controller feeds (or temporarily feeds) water to the evaporating portion. Then, the controller, in this state, executes the determination process to determine whether the open-circuit voltage of the stack increases. If the open-circuit voltage has increased or is on an increase, it indicates that steam has been properly generated from the water. In other words, at this time, it is determined that the water has been properly delivered to the evaporating portion via a water feed passage and the evaporating portion has properly generated steam, and thus the steam generation function of a steam generation system constituted of the evaporating portion, the water feed passage through which the water is fed to the evaporating portion, etc. is determined as being normal.

As such, in the determination process, if the open-circuit voltage of the stack has increased or is on an increase, the controller determines the steam generation function of the steam generation system as being normal, and then restarts the stack by feeding the water to the evaporating portion and feeding the fuel to the reforming portion. Accordingly, the power generation of the stack is started (or restarted) by feeding the fuel to the reforming portion after the steam generation function of the steam generation system has been determined as being normal in the manner described above, and this prevents any lack of steam at the reforming portion, and thus prevents coking at the reforming portion, minimizing degradation of the reforming catalyst in the reforming portion. Meanwhile, the inventor has confirmed that even if the water is fed to the evaporating portion, basically, the open-circuit voltage of the stack does not increase unless steam is generated by the evaporating portion.

On the other hand, if the water is fed to the evaporating portion and the fuel is fed to the reforming portion to restart the fuel cell system despite that the steam generation function of the steam generation system is not normal, it may result in a lack of steam at the reforming portion, causing a possibility that coking occur at the reforming portion and thus degradation of the reforming catalyst in the reforming portion be accelerated.

According to the first and second aspects of the invention, it is possible to verify, based on an increase in the voltage of the stack, whether the steam generation function of the steam generation system is normal when the power generation of the fuel cell system is suspended. That is, it is possible to verify that the steam generation function of the steam generation system including the evaporating portion, etc. is normal, before starting the power generation of the fuel cell system the next time. Accordingly, a lack of steam at the reforming portion, which may otherwise be caused due to an abnormality related to the steam generation system in the fuel cell system, can be prevented, and therefore the power generation of the stack can be performed without suffering from any lack of steam at the reforming portion. Thus, it is possible to prevent coking at the reforming portion, thus minimize degradation of the reforming catalyst in the reforming portion, thus prolong the life of the reforming portion, and thus prolong the life of the fuel cell system.

According to the first and second aspects of the invention, further, since whether steam has been generated after feeding of the water to the evaporating portion is determined based on an increase in the voltage of the stack, it is not necessary to use any sensor for detecting generation of steam, such as a temperature sensor and a flow sensor, unlike the conventional or related-art technologies, and therefore whether the steam generation system is in a normal condition can be easily determined. Certainly, any sensor including a temperature sensor, a flow sensor, etc. may be additionally used in order, for example, to achieve a higher accuracy in determining whether the steam generation system is in a normal condition.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In example embodiments of the invention, a determination process is executed while feeding a cathode fluid (gas containing oxygen, such as air) to the cathodes in the fuel cell stack. At this time, the cathodes of the respective fuel cells of the stack are cooled by the cathode fluid and thus prevented from being heated excessively. In this case, further, it is considered that the oxygen concentration at the cathodes in the fuel cell stack increases and thus the electric potential of the cathodes increases to be closer to the standard electrode potential of oxygen (+1.229 Vvs.SHE), and thus the electric potential difference between the cathodes and the anodes increases, and therefore the open circuit voltage (OCV) of the fuel cell stack increases, making it easier to detect an increase in the open circuit voltage of the fuel cell stack.

First Example Embodiment

Figure 1:
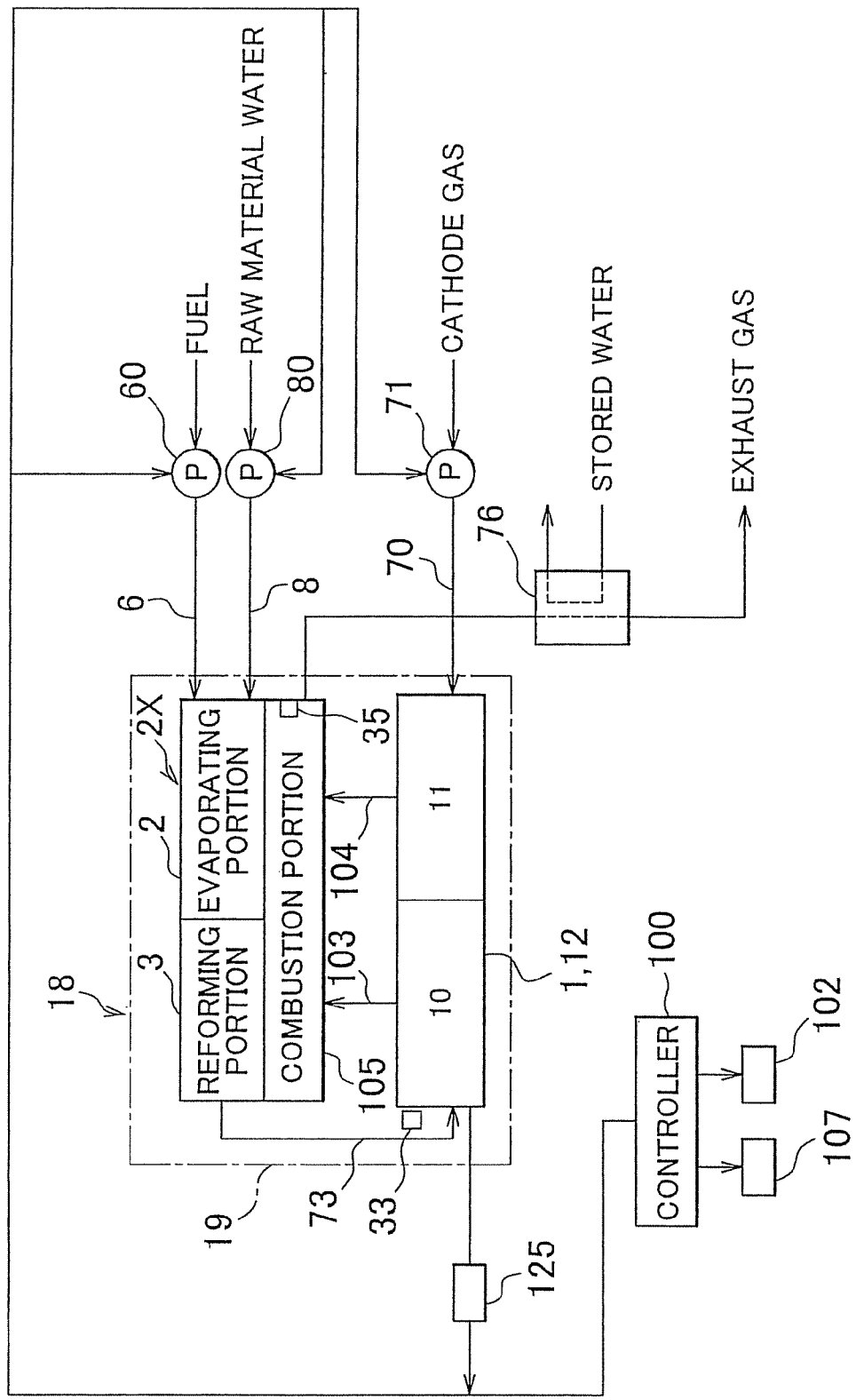
FIG. 1 is a block diagram conceptually illustrating the configuration of a fuel cell system of the first example embodiment of the invention.

The block diagram of FIG. 1 schematically shows the configuration of a fuel cell system of the first example embodiment of the invention. The fuel cell system of the first example embodiment is provided with a stack 12 of fuel cells 1 each having an anode 10 to which an anode fluid (gas containing hydrogen) is fed through an anode fluid passage 73 and a cathode 11 to which a cathode fluid (a gas containing oxygen, such as air) is fed via a cathode fluid passage 70, an evaporating portion 2 that evaporates a raw material water (water as a raw material) which is in a liquid phase, which is fed via a water feed passage 8, and thereby generates steam which is in a gas phase, the water feed passage 8 that delivers the raw material water, which is pure water, to the evaporating portion 2 using a pump 80 (water deliverer), a reforming portion 3 that produces the anode fluid by performing steam-reforming on a fuel (e.g., manufactured gas, liquefied petroleum gas (LPG)) using the steam generated at the evaporating portion 2, a combustion portion 105 that heats the evaporating portion 2 and the reforming portion 3, the pump 80 (water deliverer) that is provided on the water feed passage 8 and delivers the raw material water to the evaporating portion 2, a heat exchanger 76 that performs heat-exchange between a high-temperature exhaust gas from the stack 12 and the water in a water storage, and a controller 100 that controls various devices including the pumps 80, 60, and 71. The anode-off gas discharged from the anodes 10 is delivered to the combustion portion 105 via a passage 103, while the cathode-off gas discharged from the cathodes 11 are delivered to the combustion portion 105 via a passage 104. The combustion portion 105 combusts the anode-off gas and the cathode-off gas to heat the evaporating portion 2 and the reforming portion 3. A combustion exhaust gas passage 75 is connected to the combustion portion 105, and the combustion exhaust gas, containing both the gas burned in the combustion at the combustion portion 105 and unburned gas, is released to the atmosphere via the combustion exhaust gas passage 75.

The anodes 10 each have a catalyst for facilitating anode reactions, and the cathodes 11 each have a catalyst for facilitating cathode reactions. These catalysts may each be a transition-metal-based catalyst, preferably a noble-metal-based catalyst. The reforming portion 3 and the evaporating portion 2 are arranged adjacent or close to each other. Gaseous fuel is fed to the reforming portion 3 via the evaporating portion 2 using the pump 60 (fuel deliverer) at the fuel passage 6. The multiple fuel cells 1 constituting the stack 12 are electrically connected in series to obtain a high voltage. The cathode fluid (air) is fed to the cathodes 11 of the respective fuel cells 1 from the pump 71 (cathode pump) (cathode fluid deliverer) at the cathode fluid passage 70. The combustion portion 105 is provided to heat the evaporating portion 2 and the reforming portion 3. Thermal insulation wall 19 are provided to surround the reforming portion 3, the evaporating portion 2, the stack 12, the combustion portion 105, etc. to maintain their temperatures, whereby a power generator module 18 of which the temperature becomes high is formed.

A temperature sensor 33 that detects the internal temperature of the power generator module 18 is provided. The temperature detected by the temperature sensor 33 can be deemed also as the temperature of the stack 12 or the temperature of the reforming portion 3. A voltage sensor 125 is provided to measure the open circuit voltage (OCV) of the stack 12. The signals of the temperature sensor 33 and the voltage sensor 125 are input to the controller 100. During power generation, the internal temperature of the power generator module 18 and the temperature of the stack 12 are, although depending upon the structure, etc. of the power generator module 18, are for example, 400 to 850° C. and 500 to 800° C., respectively. However, it is to be understood that the temperature of the power generator module 18 and the temperature of the stack 12 are not limited to these ranges.

Figure 2:
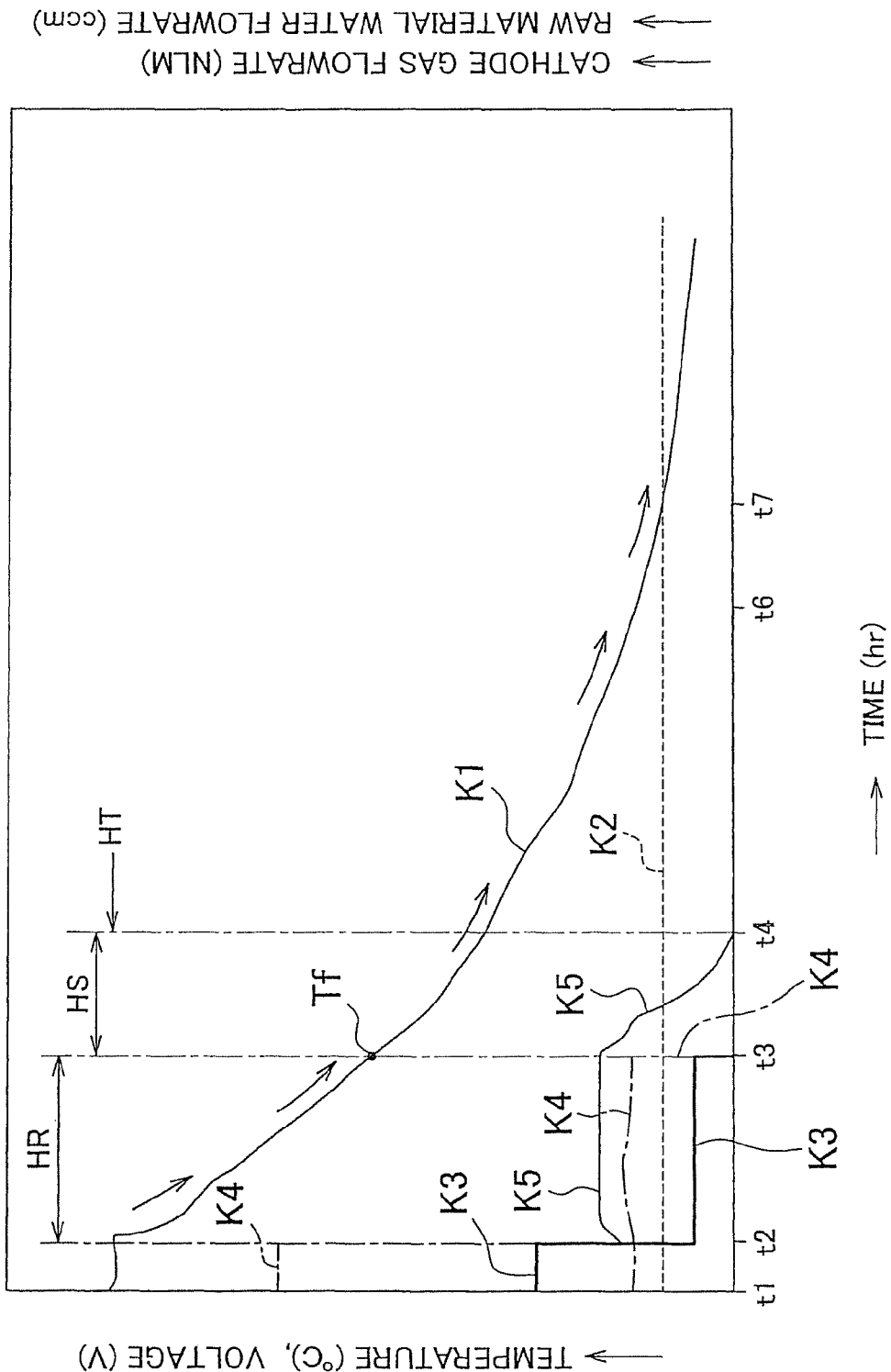
FIG. 2 is a graph illustrating how the value of each parameter changes in a state where the power generation of the fuel cell system of the first example embodiment is suspended.

The graph of FIG. 2 illustrates how the value of each parameter changes after a discontinuance command for discontinuing the power generation of the stack 12 is output at the time point t2 during the power generation of the stack 12. In the graph of FIG. 2, the horizontal axis represents time. The time progresses in the order of the time points t1, t2, t3, and so on. The vertical axis on the left represents the internal temperature (° C.) of the power generator module 18 and the open circuit voltage (OCV) (V) of the stack 12. The internal temperature of the power generator module 18 can be deemed as the temperature of the stack 12. On the other hand, the vertical axis on the right represents the flowrate (NLM) at which the cathode fluid (air) is fed to the cathodes 11 (i.e., the amount of the cathode fluid fed to the cathodes 11 per unit time), and the flowrate (ccm) at which the raw material water is fed to the evaporating portion 2 (i.e., the amount of the raw material water fed to the evaporating portion 2 per unit time).

Even in a state where the fuel cell system is not generating power, if the reforming portion 3 and the stack 12 in the power generator module 18 are exposed to the ambient atmosphere when the temperatures of the reforming portion 3 and the stack 12 are high, it may accelerate degradation of the catalysts in the reforming portion 3 and the catalysts in the fuel cells 1. For this reason, preferably, a reducing atmosphere is created in the reforming portion 3 and the stack 12 by generating hydrogen gas at the reforming portion 3, until the internal temperature of the power generator module 18 decreases to a first predetermined temperature Tf (refer to FIG. 2), which is normally set within the range of 350 to 550° C. (although depending upon the material(s) of each catalyst), that is, within a high temperature region FIR shown in FIG. 2. In this case, the catalysts in the reforming portion 3 and the catalysts in the stack 12 can be effectively protected.

As described earlier, the time point t3 shown in FIG. 2 is the time point at which the internal temperature of the power generator module 18 (i.e., the temperature of the stack 12) decreases and reaches the first predetermined temperature Tf. According to the structure described above, thus, even if the discontinuation command for discontinuing the power generation of the fuel cell system is output at the time point t2, until the time reaches the time point t3, the pump 80 is driven to feed the raw material water to the evaporating portion 2 and thereby generate steam, and the pump 60 is driven to feed the gaseous fuel to the reforming portion 3 via the evaporating portion 2 so that the reforming portion 3 performs steam-reforming on the fuel, whereby hydrogen gas is produced. It is to be noted that the fuel may be directly fed to the reforming portion 3. Since hydrogen gas is reducing gas that suppresses oxidization, even if the internal temperature of the power generator module 18 (i.e., the temperature of the stack 12 or the temperature of the reforming portion 3) is higher than the first predetermined temperature Tf, the catalyst degradation described earlier can be effectively minimized or prevented. Meanwhile, in a case where the fuel is methane-based fuel, gas containing hydrogen (anode fluid) is produced through steam-reforming as expressed by the following expression (1). However, it is to be noted that the fuel is not limited to any methane-based fuel.

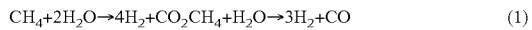
$$CH_4+2H_2O \rightarrow 4H_2+CO_2 \quad CH_4+H_2O \rightarrow 3H_2+CO \quad (1)$$

In FIG. 2, a characteristic line K1 represents the internal temperature of the power generator module 18 (i.e., the temperature of the stack 12). As indicated by the characteristic line K1, as the time passes, the internal temperature of the power generator module 18 (i.e., the temperature of the stack 12) gradually decreases. A characteristic line K2 represents the flowrate (NLM) at which the cathode fluid (air) is, fed to the cathodes 11 of the stack 12. As indicated by the characteristic line K2, the cathode pump 71 is driven to feed the cathode fluid to the cathodes 11 of the stack 12 and thus promote cooling even after the time point t2 at which the power generation is discontinued, and even after the time points t6 and t7. A characteristic line K3 represents the flowrate at which the fuel is fed to the reforming portion 3. As indicated by the characteristic line K3, although the flowrate at which to feed the fuel to the reforming portion 3 is sharply reduced after the time point t2 at which the power generation is discontinued, in order to produce hydrogen gas, serving as a reductant, at the reforming portion 3, the fuel continues to be fed to the reforming portion 3 until the time point t3 in order to protect the catalysts, etc. A characteristic line K4 represents the flowrate at which to feed the raw material water to the evaporating portion 2. As indicated by the characteristic line K4, although the flowrate at which to feed the raw material water to the evaporating portion 2 is sharply reduced after the time point t2 at which the power generation is discontinued, the raw material water continues to be fed to the evaporating portion 2 until the time point t3. As is evident from the graph of FIG. 2, the supplies of the fuel and raw material water are reduced after the time point t3, and therefore substantially no hydrogen gas is produced at the reforming portion 3. In the graph of FIG. 2, a characteristic like K5 represents the open circuit voltage (OCV) of the stack 12. As indicated by the characteristic line K5, the open circuit voltage (OCV) of the stack 12 is not zero even in the region HR between the time point t2 at which to stop the power generation of the stack 12 and the time point t3 (i.e., a time zone in which hydrogen gas, serving as a reductant for protecting the catalysts, is produced despite that the power generation is not performed). In the region HR, although not verified enough, the hydrogen gas produced at the reforming portion 3 is fed to the anodes 10, so that the hydrogen concentration in the anodes 10 becomes relatively high, and thus the electric potential of the anodes 10 becomes close to the standard electrode potential of hydrogen (0 V), and therefore the open circuit voltage (OCV), which is the electric potential difference between the anodes 10 and the cathodes 11, is high in the region HR.

As is indicated by the characteristic line K5 in FIG. 2, the voltage of the stack 12 gradually decreases from the time point t3 and becomes almost zero at the time point t4. A range from the time point t3 to the time point t4 is identified as "region HS" in the graph in FIG. 2. In the region HS, although the open circuit voltage (OCV) of the stack 12 is not zero, it gradually decreases.

The following is the reason why the open circuit voltage (OCV) of the stack 12 gradually decreases in the region HS. The supply of the raw material water to the evaporating portion 2 is stopped at the time point t3, and the supply of the fuel to the reforming portion 3 is stopped at the time point t3. Therefore, in the region HS, the steam falls short, resulting in an insufficient amount of the fuel being reformed. Thus, although not verified enough, the amount of hydrogen produced through steam reforming of the fuel becomes insufficient, causing a shortage of hydrogen gas at the anodes 10 of the stack 12. As a result, the electric potential of the anodes 10 of the stack 12 is affected by gases other than hydrogen gas, such as air, making the electric potential of the anodes 10 relatively high, and thus causing a decrease in the open circuit voltage (OCV) of the stack 12.

Next, a description will be made of a case where the fuel cell system is restarted while the temperature of the evaporating portion 2 is still high enough to generate steam (or while the temperature of the evaporating portion 2 is a reference temperature being capable of generating steam) after the power generation of the stack 12 is discontinued at the time point t2. In this case, since the temperature of the evaporating portion 2 needs to be still high enough to generate steam, generally, it is preferable that the internal temperature of the power generator module 18 (i.e., the temperature of the stack 12) or the temperature of the evaporating portion 2 be equal to or higher than a predetermined temperature T1. Although depending upon the configuration and structure of the fuel cell system, the predetermined temperature T1 may be 110, 150, 200, or 250° C., for example. In a state where the temperature of the evaporating portion 2 is still high enough to generate steam, before igniting the fuel at the combustion portion 105 using an igniter 35 to heat the reforming portion 3 and the stack 12 for restarting the fuel cell system, the controller 100 drives the pump 80 for a predetermined time period Δtp to temporarily feed the raw material water to the evaporating portion 2 while monitoring the open circuit voltage (OCV) of the stack 12. For example, the amount of the raw material water to be thus fed to the evaporating portion 2 for the determination process may be, although depending upon the rated output, etc. of the fuel cell system, 0.05 to 5 cc in total, preferably 0.5 to 2 cc in total. However, it is to be noted that the feed amount of the raw material water is not limited any of these ranges. In general, the larger the fuel cell system in size or capacity, the larger the raw material water feed amount is made, whereas the smaller the fuel cell system in size or capacity, the smaller the raw material water feed amount is made. When vaporized, the raw material water increases in volume tremendously. Therefore, it is considered that the raw material water vapor effectively forces the hydrogen remaining in the reforming portion 3 out to the anodes 10 in the stack 12.

If the open circuit voltage (OCV) of the stack 12 increases later, the controller 100 determines that the steam generation function of the evaporating portion 2 is normal. In this case, therefore, the controller 100 outputs an "OK" signal indicating that the state of the water feed passage 8 is normal and the steam generation function of the evaporating portion 2 is normal.

Then, since the steam generation function of the evaporating portion 2 has been determined as being normal, the controller 100, for restarting the fuel cell system, drives the pump 80 to feed the raw material water to the evaporating portion 2 so that steam is generated, and drives the pump 60 to feed the fuel to the reforming portion 3 via the evaporating portion 2 so that the fuel is reformed though steam-reforming and thereby a gas containing hydrogen (i.e., the anode fluid) is produced in the reforming portion 3. The hydrogen-containing gas travels to the combustion portion 105 and then is combusted through ignition by the igniter 35. As a result, the temperatures of the stack 12, the reforming portion 3, and the evaporating portion 2 become high, allowing execution of the power generation of the stack 12. Preferably, the determination process described above is executed in a state where the open circuit voltage (OCV) of the stack 12 is not zero, that is, in the region HS shown in FIG. 2. Since the raw material water is not fed to the evaporating portion 2 in the region HS, when the determination process is executed in the region HS, the raw material water is temporarily fed to the evaporating portion 2.

Meanwhile, referring to the characteristic line K5 in FIG. 2, the open circuit voltage (OCV) of the stack 12 is relatively low in the region HS as compared to the region HR, an increase in the open circuit voltage (OCV) of the stack 12 can be more easily detected in the region HS, and thus whether the steam generation function of the evaporating portion 2 is normal can be more accurately determined in advance. Certainly, although the open circuit voltage (OCV) of the stack 12 is zero or almost zero in a region HT following the region HS (refer to FIG. 2), as long as the temperature of the evaporating portion 2 remains high enough to generate steam, that is, as long as the internal temperature of the power generator module 18 (i.e., the temperature of the stack 12) is equal to or higher than the predetermined temperature T1, the determination process described above can be executed in the region HT as well. Meanwhile, since the more the stack 12 and the power generator module 18 are cooled, the lower the temperature of the evaporating portion 2, preferably, the determination process described above is executed when the internal temperature of the power generator module 18 (i.e., the temperature of the stack 12) is equal to or higher than the predetermined temperature T1.

Figure 3:
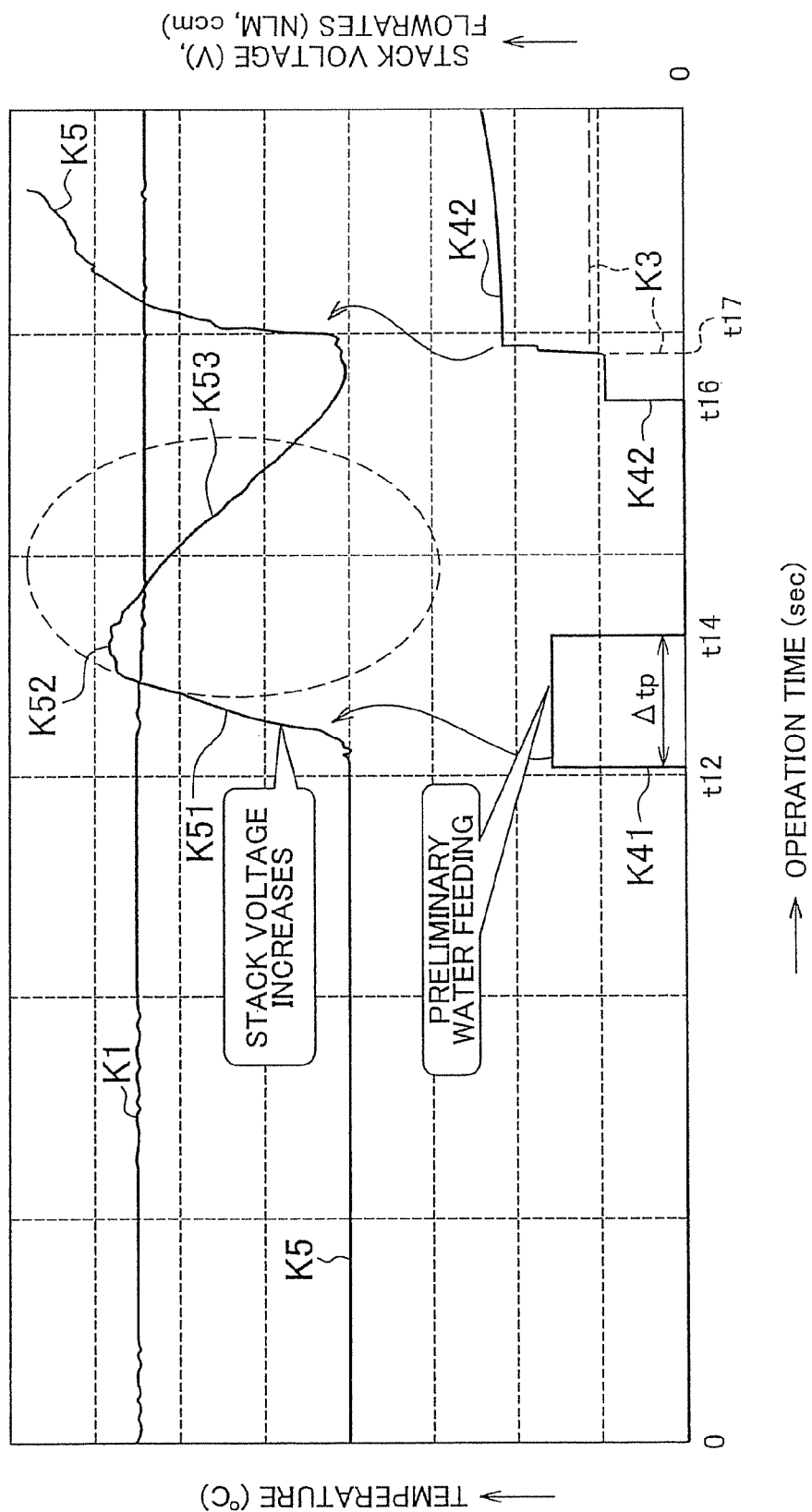
FIG. 3 is a chart illustrating how the voltage of the stack, etc. change in a state where the power generation of the fuel cell system of the first example embodiment is suspended and the raw material water is fed to the evaporating portion.

The chart of FIG. 3 illustrates how the open circuit voltage (OCV) of the stack 12, etc. change in a state where: the power generation of the stack 12 is suspended; the internal temperature of the power generator module 18 (i.e., the temperature of the stack 12) or the temperature of the evaporating portion 2 is equal to or higher than the predetermined temperature T1, that is, the temperature of the evaporating portion 2 is still high enough to generate steam in the region HS shown in FIG. 2; and the stack 12 is to be restarted. In the chart of FIG. 3, the horizontal axis represents time (sec), while the vertical axis on the left represents a temperature (° C.) and the vertical axis on the right represents the open circuit voltage (OCV) (V) of the stack 12, the fuel flowrate (NLM), and the raw material water flowrate (ccm). Further, in the chart in FIG. 3, a characteristic line K1 represents the temperature of the stack 12. Since the horizontal axis is a second time scale, the inclination of the characteristic line K1 is small. A characteristic line K3 represents the flowrate at which the fuel is fed per unit time at the time of restarting the stack 12. A characteristic line K41 represents the flowrate at which the raw material water is fed per unit time in the determination process. A characteristic line K42 represents the flowrate at which the raw material water is fed per unit time at the time of restarting the stack 12. A characteristic line K5 represents the open circuit voltage (OCV) of the stack 12.

In this example embodiment, in a state where the stack 12 is not generating power but the internal temperature of the power generator module 18 (i.e., the temperature of the stack 12) or the temperature of the evaporating portion 2 is equal to or higher than the predetermined temperature T1, that is, the temperature of the evaporating portion 2 is still high enough to generate steam, the raw material water is fed to the evaporating portion 2 for a time period Δtp from a time point t12 to execute the determination process, as indicated by the characteristic line K41 in FIG. 3. As a result, as indicated by a local line portion K51 of the characteristic line K5, the open circuit voltage (OCV) of the stack 12 starts increasing immediately after the time point t12 and then peaks at a peak K52, and then gradually decreases as indicated by a local line portion K53 of the characteristic line K5. As such, the open circuit voltage (OCV) of the stack 12 increases, peaks, and then decreases. When the open circuit voltage (OCV) of the stack 12 has increased to a predetermined level or higher, the controller 100 determines that the steam generation function of the evaporating portion 2 is normal. Then, as indicated by the characteristic line K42, the controller 100 drives the pump 80 to feed the raw material water to the evaporating portion 2 from a time point t16. Thereafter, as indicated by the characteristic line K3, the controller 100 drives the pump 60 to feed the fuel to the reforming portion 3 from a time point t17. As is shown in FIG. 3, the open circuit voltage (OCV) of the stack 12 increases again from around the time point t17 at which the controller 100 started feeding the fuel to the reforming portion 3.

Referring back to FIG. 2, as time passes from the time point t2 at which the power generation of the stack 12 is suspended, the internal temperature of the power generator module 18 (i.e., the temperature of the stack 12) gradually decreases. As in the case described above by way example, a command for restarting the fuel cell system may be issued in a state where the power generation of the stack 12 is suspended. In such a case, the controller 100 executes a system restart process for restarting the stack 12 to resume the power generation. In a case where the stack 12 is to be thus restarted while the temperature of the evaporating portion 2 is equal to or higher than the predetermined temperature (e.g., 110, 150, 200, or 250° C.), that is, the internal temperature of the power generator module 18 (i.e., the temperature of the evaporating portion 2) is equal to or higher than the predetermined temperature T1, the controller 100, before executing the system restart process described above, temporarily feeds the raw material water to the evaporating portion 2, in the manner described earlier, prior to the ignition by the igniter 35. Then, the controller 100 executes the determination process for determining whether the open circuit voltage (OCV) of the stack 12 increases. If the open circuit voltage (OCV) of the stack 12 has increased, the controller 100 determines that the evaporating portion 2 has generated steam properly. In the meantime, the inventor, and the like, have continued that even if the raw material water is fed to the evaporating portion 2, the open circuit voltage (OCV) of the stack 12 does not basically change unless steam is generated. In view of this, it is considered that the above-described increase in the open circuit voltage (OCV) of the stack 12 is due to the generation of steam.

More specifically, when the open circuit voltage (OCV) of the stack 12 has increased, the controller 100 determines that a steam generation system 2X constituted of the evaporating portion 2, the water feed passage 8, etc. is in a normal condition and thus the steam generation system 2X has properly generated steam. As such, when the open circuit voltage (OCV) of the stack 12 has increased, the controller 100 determines that the steam generation system 2X constituted of the evaporating portion 2, the water feed passage 8, etc. is in a normal condition and thus executes the system restart process, so that the raw material water is fed to the evaporating portion 2 while the fuel is fed to the reforming portion 3, resuming the power generation of the stack 12. In this way, it is verified in advance that the steam generation function of the steam generation system 2X is normal, and then the fuel is fed to the reforming portion 3 to resume the power generation of the stack 12. Accordingly, a lack of steam at the reforming portion 3 can be prevented, and thus coking at the reforming portion 3 can be prevented. As a result, degradation of the reforming catalyst of the reforming portion 3 can be minimized, prolonging the lives of the reforming portion 3 and the stack 12.

On the other hand, if the fuel is fed to the reforming portion 3 to resume the power generation despite that the steam generation function of the stack 12 is not normal, coking occurs at the reforming portion 3, which may accelerate the degradation of the reforming catalyst of the reforming portion 3 and therefore shorten the life of the reforming portion 3, thus the life of the fuel cell system.

(Control Procedure Example)

Figure 4:
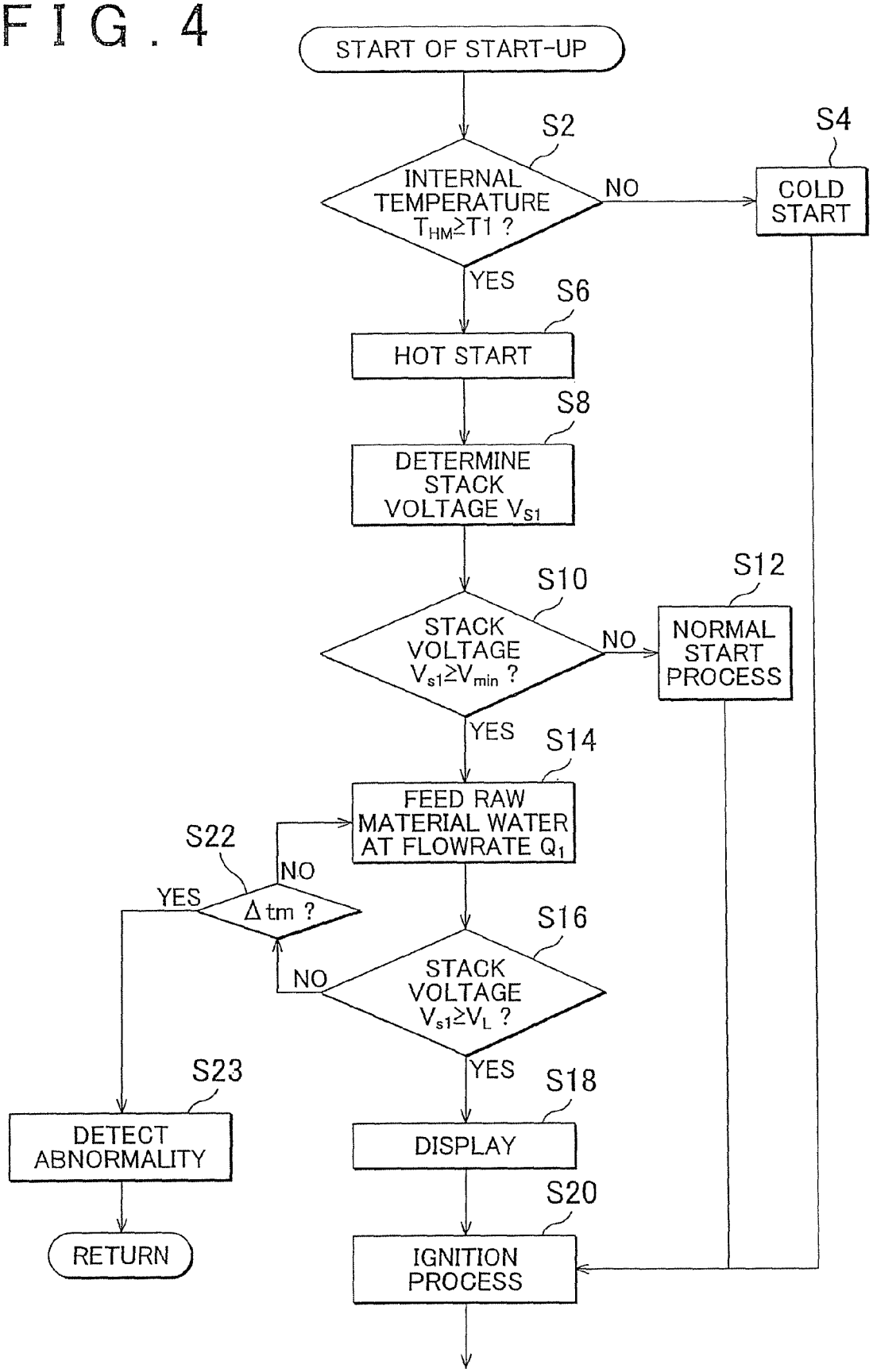
FIG. 4 is a flowchart illustrating an example control procedure executed by a controller.

The flowchart of FIG. 4 illustrates, by way example, a control procedure that the CPU of the controller 100 executes. Referring to FIG. 4, when a system start command is issued in a state where the power generation of the fuel cell system is suspended, the controller 100 first reads an internal temperature $T_{HM}$ of the power generator module 18 and then determines whether the internal temperature $T_{HM}$ is equal to or higher than the predetermined temperature T1 (step S2). The internal temperature $T_{HM}$ may be substantially regarded as indicating the temperatures of the stack 12, the reforming portion 3, and the evaporating portion 2. If the internal temperature $T_{HM}$ is lower than the predetermined temperature T1 (step S2: NO), it indicates that the internal temperature of the power generator module 18 is low (i.e., the temperatures of the stack 12 and the reforming portion 3 are low) and thus the temperature of the evaporating portion 2 is not kept high enough to generate steam. In this case, therefore the controller 100 turns on a flag for a cold start process (step S4), and then proceeds to an ignition process (step S20).

Referring back to step S2, if the internal temperature $T_{HM}$ of the power generator module 18 is equal to or higher than the predetermined temperature T1 (step S2: YES), on the other hand, it indicates the internal temperature of the power generator module 18 is high (i.e., the temperatures of the stack 12 and the reforming portion 3 are high) and therefore the temperature of the evaporating portion 2 is still high enough to generate steam. In this case, therefore, the controller 100 turns on a flag for a hot start process (step S6), and then determines an open circuit voltage $V_{S1}$ of the stack 12 (step S8). If the open circuit voltage $V_{S1}$ is equal to or higher than a threshold voltage $V_{min}$ (step S10: YES), it indicates that the present operation point is in the region HR or the region HS (refer to FIG. 2). In this case, therefore, the controller 100 drives the pump 80 to feed the raw material water to the evaporating portion 2 at a flowrate $Q_1$ (step S14). If the steam generation system 2X is in a normal condition, in response to the raw material water thus being fed to the evaporating portion 2, the evaporating portion 2 generates steam, whereby the open circuit voltage (OCV) of the stack 12 increases.

Thereafter, when the open circuit voltage $V_{S1}$ of the stack 12 becomes equal to or higher than a threshold voltage $V_L$ (step S16: YES), it is recognized that the open circuit voltage (OCV) of the stack 12 has increased. In this case, the steam generation system 2X constituted of the evaporating portion 2, the water feed passage 8, etc. is deemed as being in a normal condition, and thus it is determined that the steam generation system 2X is properly generating steam. Therefore, the controller 100 turns on a flag indicating that steam is being generated properly (step S18), and outputs to a display portion 107 a display command for displaying information indicating that the steam generation system 2X constituted of the evaporating portion 2, the water feed passage 8, the pump 80, etc. is in a normal condition (step S18), after which the controller 100 proceeds to the ignition process (S20). Referring back to step S16, in contrast, if the open circuit voltage $V_{S1}$ of the stack 12 is lower than the threshold voltage $V_L$, that is, if it is not yet detected that the open circuit voltage (OCV) of the stack 12 has increased, the controller 100 executes a time determination process (step S22), and then outputs a command for continuing to drive the pump 80 so that the raw material water continues to be fed to the evaporating portion 2 at the flowrate $Q_1$ (step S14). Meanwhile, the time determination process in step S22, the controller 100 determines whether a predetermined time period $\Delta tm$ has passed from the time point at which the raw material water started to be fed to the evaporating portion 2 (i.e., the time point t12 in the example illustrated in FIG. 3). If the predetermined time period $\Delta tm$ has not yet passed from the time point at which the raw material water started to be fed to the evaporating portion 2, the raw material water continues to be fed to the evaporating portion 2.

Meanwhile, if it is not detected the open circuit voltage (OCV) of the stack 12 has increased (i.e., the open circuit voltage $V_{S1}$ has become equal to or higher than the threshold voltage $V_L$) despite that the predetermined time period $\Delta tm$ has passed from the time point at which the raw material water started to be fed to the evaporating portion 2 (step S22: YES), it indicates that the steam generation system 2X is not generating steam properly, and thus the controller 100 determines that the steam generation function of the steam generation system 2X is abnormal. In this case, therefore, the controller 100 outputs a signal indicating that the steam generation system 2X is in an abnormal condition and a command for canceling the system start to an alarm 102 and the display portion 107 for notification for users or mechanics, after which the controller 100 returns to the main routine.

In the meantime, if it is determined in step SW that the open circuit voltage $V_{S1}$ of the stack 12 is lower than the threshold voltage $V_{min}$ (step S10: NO), a normal system start process is executed. This is because, referring to the example illustrated in FIG. 2, when the open circuit voltage $V_{S1}$ of the stack 12 is lower than the threshold voltage $V_{min}$, it indicates that a long period time has already passed since the power generation of the fuel cell system was discontinued, and therefore the internal temperature of the power generator module 18 (i.e., the temperature of the stack 12) is presently very low and the temperature of the evaporating portion 2 is as low as it is unable to generate steam properly. However, even in a case where it is determined in step S10 that the open circuit voltage $V_{S1}$ of the stack 12 is lower than the threshold voltage $V_{min}$, if the internal temperature of the power generator module 18 (i.e., the temperature of the stack 12) is high and thus the temperature of the evaporating portion 2 is still high enough to generate steam properly, the pump 80 may be driven to feed the raw material water to the evaporating portion 2 to determine whether the open circuit voltage (OCV) of the stack 12 will increase.

Second Example Embodiment

The second example embodiment has basically the same configuration and effects as those of the first example embodiment. In the following, the differences of the second example embodiment from the first example embodiment will be mainly described. In the determination process, the controller 100 obtains the rate at which the open circuit voltage (OCV) of the stack 12 increases (i.e., a differential value obtained by differentiating the open circuit voltage (OCV) of the stack 12 with respect to time). If the increase rate of the open circuit voltage (OCV) of the stack 12 is equal to or higher than a first predetermined value that is a reference voltage increase rate, the controller 100 determines that the open circuit voltage (OCV) of the stack 12 has increased and therefore the steam generation system 2X constituted of the evaporating portion 2, the water feed passage 8, etc. is in a normal condition. When the steam generation system 2X constituted of the evaporating portion 2, the water feed passage 8, etc. is thus determined as being in a normal condition, the controller 100 executes the system restart process to feed the raw material water to the evaporating portion 2 and feed the fuel to the reforming portion 3, resuming the power generation of the stack 12. Preferably, the determination process is executed in the regions HR and/or HS shown in FIG. 2. However, it is to be noted that the determination process may be executed also in the region HT shown in FIG. 2 if the temperature of the evaporating portion 2 is still high enough to generate steam. Since the use of such a differential value allows factoring in time, it is easy to associate the feeding of the raw material water with an increase in the open circuit voltage (OCV) of the stack 12. Further, the use of such an increase rate in the open circuit voltage (OCV) of the stack 12 makes it easier to avoid or prevent the interferences of noises that may be caused by factors other than the feeding of the raw material water.

In contrast, when the increase rate of the open circuit voltage (OCV) of the stack 12 is lower than the first predetermined value that is the reference voltage increase rate, the controller 100 determines that the open circuit voltage (OCV) of the stack 12 has not increased. In this case, since there is a possibility that the steam generation system 2X constituted of the evaporating portion 2, the water feed passage 8, etc. be in an abnormal condition due to water leak, or the like, the controller 100 outputs the abnormality signal to the alarm 102 for alarming.

Third Example Embodiment

The third example embodiment has basically the same configuration and effects as those of the first example embodiment. In the following, the differences of the third example embodiment from the first example embodiment will be mainly described. Even after the power generation of the fuel cell system is discontinued, it is considered that a certain amount of hydrogen remains in the material(s) of the reforming portion 3. In the third example embodiment, thus, the controller 100 is adapted to, in the determination process, determine that the open circuit voltage (OCV) of the stack 12 has increased, when the controller 100 has detected an increase in the open circuit voltage (OCV) of the stack 12 (refer to the local line portion K51 shown in FIG. 3), a peak of the open circuit voltage (OCV) of the stack 12 (refer to a local line portion K52 shown in FIG. 3), and a decrease in the open circuit voltage (OCV) of the stack 12 (refer to a local line portion K53 shown in FIG. 3) in this order. The controller 100 then executes the system restart process to feed the raw material water to the evaporating portion 2 and feed the fuel to the reforming portion 3, resuming the power generation of the stack 12. It is considered that the residual hydrogen in the anodes 10 leaves the reforming portion 3 due to the steam generated from the raw material water and then reaches the anodes 10 when the open circuit voltage (OCV) of the stack 12 is on the increase (refer to the local line portion K51) and when it is at the peak (refer to the local line portion K52). On the other hand, with regard to the decrease after the peak in the open circuit voltage (OCV) of the stack 12 (refer to the local line portion K53), it is considered that the hydrogen, after reaching the anodes 10 of the stack 12, is further discharged toward the downstream side, so that the open circuit voltage (OCV) of the stack 12 decreases. As such, when the open circuit voltage (OCV) of the stack 12 is on the decrease (refer to the local line portion K53) after the peak, the hydrogen that has reached the anodes 10 in the stack 12 is further discharged to the downstream side. Therefore, if it is detected that the open circuit voltage (OCV) of the stack 12 decreases after peaking (refer to the local line portion K53), it indicates that no hydrogen remains in the anodes 10 in the stack 12, and therefore the state of the anodes 10 is reset (i.e., reset to a state free of residual hydrogen). Preferably, the determination process is executed in the regions HR and/or HS shown in FIG. 2. However, it is to be noted that the determination process may be executed also in the region HT shown in FIG. 2 if the temperature of the evaporating portion 2 is still high enough to generate steam.

Fourth Example Embodiment

The fourth example embodiment has basically the same configuration and effects as those of the first example embodiment. In the following, the differences of the fourth example embodiment from the first example embodiment will be mainly described. In the fourth example embodiment, the higher the internal temperature of the power generator module 18 (i.e., the temperature of the evaporating portion 2), the larger the amount of the raw material water fed to the evaporating portion 2. When the internal temperature of the power generator module 18 (i.e., the temperature of the evaporating portion 2) is high, the evaporating portion 2 has a large amount of heat. According to the structure described above, therefore, when the internal temperature of the power generator module 18 (i.e., the temperature of the evaporating portion 2) is high, a larger amount of steam is generated by the evaporating portion 2, thus increasing the amount of force for forcing the residual gas at the reforming portion 3 out toward the anodes in the stack 12. Thus, it is considered that the above-described structure makes it easier to increase the open circuit voltage (OCV) of the stack 12 and thereby achieves a higher accuracy of the determination process. In the fourth example embodiment, further, the lower the internal temperature of the power generator module 18 (i.e., the temperature of the evaporating portion 2), the smaller the amount of the raw material water fed to the evaporating portion 2. This is because when the temperature of the evaporating portion 2 is low, the raw material water fed to the evaporating portion 2 in the determination process causes a decrease in the temperature of the evaporating portion 2 and thus affects its steam generation function.

Fifth Example Embodiment

The fifth example embodiment has basically the same configuration and effects as those of the first example embodiment. In the following, the differences of the fifth example embodiment from the first example embodiment will be mainly described. In the fifth example embodiment, when the temperature of the evaporating portion 2 is still high enough to generate steam, that is, the internal temperature of the power generator module 18 (i.e., the temperature of the evaporating portion 2) is equal to or higher than the predetermined temperature T1 after the command for discontinuing the power generation of the fuel cell system, the controller 100 drives the pump 80 to feed the raw material water to the evaporating portion 2 temporarily, in order to execute the determination process described above. According to this structure, whether the steam generation system 2X constituted of the evaporating portion 2, the water feed passage 8, etc. is in a normal condition can be automatically checked each time the power generation of the fuel cell system is discontinued. Preferably, the determination process is executed in the regions HR or HS shown in FIG. 2. However, it is to be noted that the determination process may be executed in the region HT shown in FIG. 2 if the temperature of the evaporating portion 2 is still high enough to generate steam.

(First Application Form)

Figure 5:
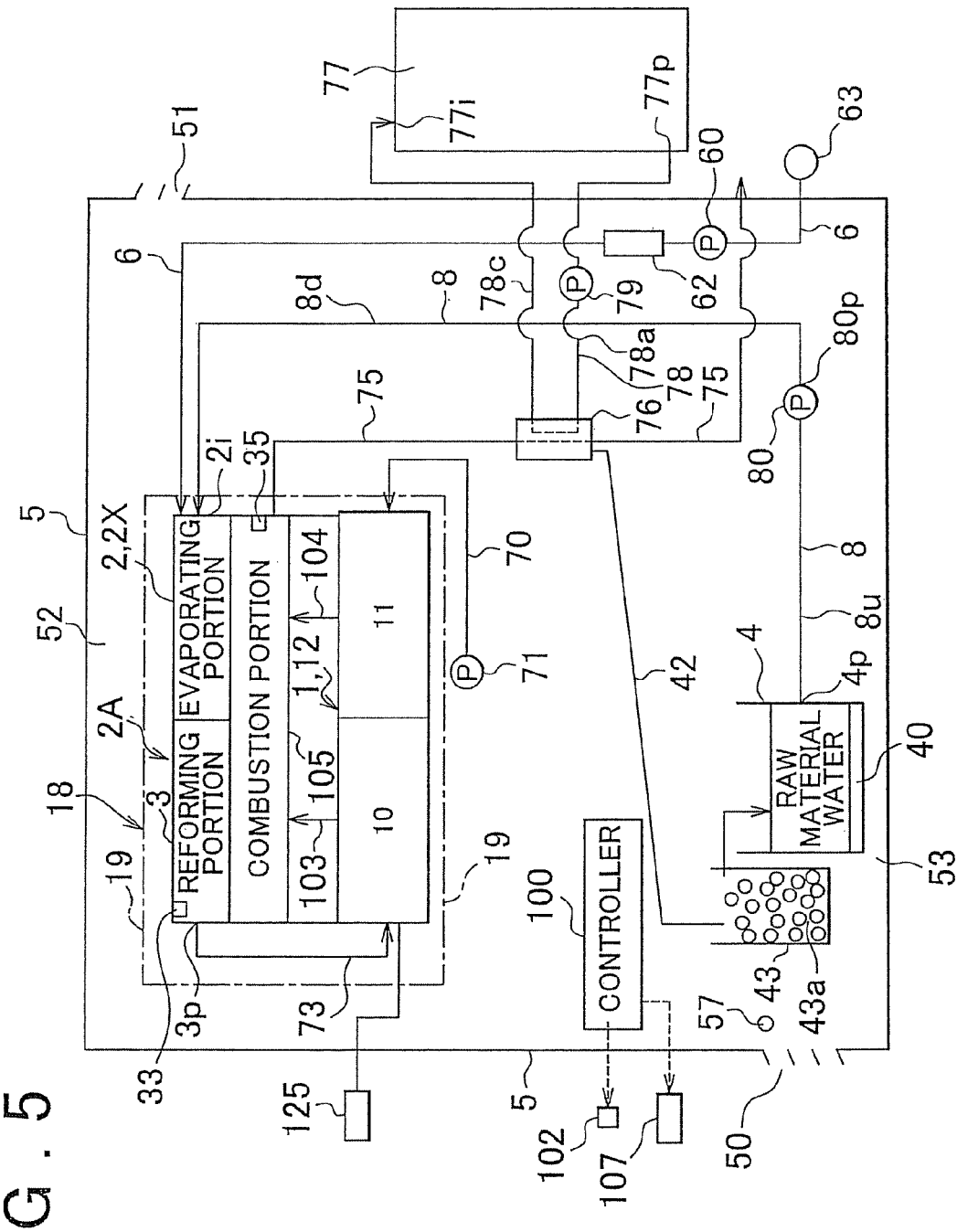
FIG. 5 is a view showing a fuel cell system configuration according to the first application form.

FIG. 5 is a schematic view conceptually illustrating the first application form. Referring to FIG. 5, the fuel cell system is provided with the stack 12 that is constituted of the fuel cells 1, the evaporating portion 2 that generates steam by vaporizing water in a liquid phase, the reforming portion 3 that produces anode gas by reforming the fuel using the steam generated at the evaporating portion 2, the combustion portion 105 that heats the evaporating portion 2 and the reforming portion 3, and a tank 4 that stores therein the liquid-phase raw material water to be fed to the evaporating portion 2, and a case 5 that accommodates these components.

Each stack 12 of the fuel cell 1 has the anode 10, the cathode 11, and an ion conductor interposed between them. For example, solid-oxide fuel cells (SOFCs) of which the operation temperature is, for example, 400° C. or higher may be used as the fuel cells 1. The anode-off gas discharged from the anodes 10 is delivered to the combustion portion 105 via the passage 103, while the cathode-off gas discharged from the cathodes 11 is delivered to the combustion portion 105 via the passage 104. The combustion portion 105 heats the evaporating portion 2 and the reforming portion 3 by combusting the anode-off gas and the cathode-off gas. The combustion exhaust gas passage 75 is connected to the combustion portion 105, and the combustion exhaust gas containing both the gas burned in the combustion at the combustion portion 105 and unburned gas is released to the atmosphere via the combustion exhaust gas passage 75. The reforming portion 3 is constituted of a carrier (e.g., a ceramic) which has a number of pores serving as gas passages and on which the reforming catalyst is supported. The reforming portion 3 is arranged adjacent to the evaporating portion 2. Thus, the reforming portion 3 and the evaporating portion 2 constitute a reformer 2A. That is, the power generator module 18 is constituted of the reforming portion 3, the evaporating portion 2, the combustion portion 105, and the stack 12, which are all surrounded by the thermal insulation wall 19. The temperature sensor 33 for detecting the temperature of the reforming portion 3 is provided in the reforming portion 3, and the igniter 35 serving as a heater for igniting the fuel is provided in the combustion portion 105. The igniter 35 may be of any form, structure, and so on, as long as it is capable of igniting the fuel at the combustion portion 105. The signals of the temperature sensor 33 are input to the controller 100, and the controller 100 activates the igniter 35 to ignite the fuel at the combustion portion 105 to heat the combustion portion 105 up to a high temperature. The controller 100 has the alarm 102.

During the power generation of the fuel cell system, the reformer 2A is heated to effect proper reforming reactions on the inner side of the thermal insulation wall 19. That is, in operation, the combustion portion 105 heats the evaporating portion 2 such that the evaporating portion 2 becomes capable of generating steam by heating the raw material. In a case where solid-oxide fuel cells (SOFCs) are used as the fuel cells 1, the anode-off gas discharged from the anodes 10 and the cathode-off gas discharged from the cathodes 11 are combusted at the combustion portion 105, and therefore the reforming portion 3 and the evaporating portion 2 are heated concurrently. A fuel passage 6 delivers the fuel from a fuel source 63 to the reformer 2A, and the pump 60 and a desulfurizer 62 are provided at the fuel passage 6. The cathode fluid passage 70 is connected to the cathodes 11 of the respective fuel cells 1, and the cathode gas (air) is fed to the cathodes 11 via the cathode fluid passage 70. The cathode pump 71 serving as a cathode gas deliverer is provided at the cathode fluid passage 70.

Referring to FIG. 5, the case 5 has an air inlet 50 and an exhaust gas outlet 51 through which the interior of the case 5 communicates with the atmosphere. Further, the case 5 has an upper space 52 that is the first chamber and a lower space 53 that is the second chamber. The fuel cells 1 are, together with the reforming portion 3 and the evaporating portion 2, disposed in the upper side of the case 5, that is, the upper space 52. The tank 4 storing therein the liquid-phase water to be reformed at the reforming portion 3 is disposed in the lower space 53 of the case 5. A heating portion 40 having a heating function (e.g., electric heater) is provided at the tank 4. The heating portion 40 heats the water stored in the tank 4, and it may be an electric heater, or the like. For example, when the environmental temperature (e.g., outside air temperature) is low, the heating portion 40 heats, under the command from the controller 100, the water in the tank 4 to prevent freezing of the water. Meanwhile, preferably, the water level in the tank 4 is still substantially constant.

Referring to FIG. 5, an outlet port 4p of the tank 4 in the lower space 53 and an inlet port 2i of the evaporating portion 2 in the upper space 52 communicate with each other via the water feed passage 8 that is provided in the form of a pipe in the case 5. The water feed passage 8 is a passage through which to deliver the water stored in the tank 4 from the outlet port 4p of the tank 4 to the evaporating portion 2. The water feed passage 8 and the evaporating portion 2 constitute the steam generation system 2X. The pump 80 serving as a water deliverer for delivering the water stored in the tank 4 to the evaporating portion 2 is provided at the water feed passage 8. It is to be noted that the water feed passage 8 is in communication with the atmosphere via the evaporating portion 2, the reforming portion 3, and the stack 12, and so on. The controller 100 controls the pumps 80, 71, 79 and 60.

At the time of starting the fuel cell system up, the pump 60 is driven to feed the fuel to the combustion portion 105 via the evaporating portion 2, the reforming portion 3, and the anodes 10, and the cathode pump 71 is driven to deliver the cathode gas (air) into the power generator module 18. Then, the igniter 35 is activated to produce combustion flames in the combustion portion 105. As such, the inside of the power generator module 18 is heated, and thus the evaporating portion 2, the reforming portion 3, and the stack 12 are heated. The power generation is started when the internal temperature of the power generator module 18 becomes high. That is, at this time, the pump 80 is driven to deliver the water in the tank 4 from the outlet port 4p to the inlet port 2i of the evaporating portion 2 via the water delivery passage 8, and the delivered water is then heated into steam at the evaporating portion 2 that is at a high temperature. The steam travels to the reforming portion 3 together with the fuel that has been fed to the evaporating portion 2 via the fuel passage 6. Note that this fuel is preferably gaseous fuel, but it may be in a liquid phase if appropriate. In the reforming portion 3, the fuel is reformed into the anode gas (hydrogen-containing gas) through steam-reforming. The anode gas is fed to the anodes 10 of the respective fuel cells 1 from an outlet port 3p of the reforming portion 3 via the anode fluid passage 73. Further, the cathode pump 71 is driven to feed the cathode gas (i.e., oxygen-containing gas, the air in the case 5) to the cathodes 11 of the respective fuel cells 1 via the cathode fluid passage 70. This is the state where power generation reactions occur in the fuel cells 1.

With regard to the power generation reactions, it is basically considered that the reaction (2) expressed below occurs at the anodes 10 to which hydrogen-containing gas is fed as the anode gas, and the reaction (3) expressed below occurs at the cathodes 11 to which air (oxygen) is fed as the cathode gas. The oxygen ions ($O^{2-}$) produced at the cathodes 11 travel to the anodes 10 from the cathodes 11 through the electrolyte.

$$H_2 + O^{2-} \rightarrow H_2O + 2e^-. \quad (2)$$

(If CO is contained, $CO + O^{2-} \rightarrow CO_2 + 2e^-$)

$$\tfrac{1}{2}O_2 + 2e^- \rightarrow O^{2-} \quad (3)$$

The anode-off gas, which is produced as a result of the power generation reactions, contains the hydrogen that was not subjected to the power generation reactions, and the cathode-off gas, which is also produced as a result of the power generation reactions, contains the oxygen that was not subjected to the power generation reactions. The anode-off gas and the cathode-off gas are delivered to the combustion portion 105 and then combusted therein. Through the combustion, the anode-off gas and the cathode-off gas turn into exhaust gas, and the exhaust gas flows through the combustion exhaust gas passage 75 in which the heat exchanger 76 is provided, and then is discharged to the outside of the case 5 via an exhaust gas outlet, located at the downstream end, of the combustion exhaust gas passage 75. Referring to FIG. 5, the heat exchanger 76 that has a condensing function is provided at the combustion exhaust gas passage 75. A water passage 78 is connected to a water storage 77, and a water pump 79 is provided in the water passage 78. The water passage 78 has a feed passage 78a and a return passage 78c. As the water pump 79 is driven, the low temperature water in the water storage 77 is discharged from a discharge port 77p of the water storage 77, then delivered to the heat exchanger 76 via the feed passage 78a, and then heated by the heat exchanger 76. The water heated by the heat exchanger 76 is then returned into the water storage 77 via the return passage 78c and a return port 77i of the water storage 77. As such, the water in the water storage 77 is warmed. Meanwhile, the water vapor contained in the exhaust gas described above is condensed at the heat exchanger 76 into its liquid state, and the liquid state water is delivered, by gravity, etc., to a water purification portion 43 via a liquid-state water passage 42 extending from the heat exchanger 76. The water purification portion 43 has a water purifier 43a, which is made of ion-exchange resin, for example. Thus, the impurities in the liquid-state water are removed by the water purification portion 43. After this, the liquid-state water is delivered to the tank 4 and stored therein. As the pump 80 is driven, the water in the tank 4 is fed to the evaporating portion 2, which is at a high temperature, via the water feed passage 8, then converted into steam at the evaporating portion 2, then fed to the reforming portion 3, and consumed at the reforming portion 3 for the reforming reactions for reforming the fuel.

In this application form, too, the determination process is executed before ignition by the igniter 35 when the stack 12 is to be restarted in a state where the power generation of the stack 12 is suspended but the internal temperature of the power generator module 18 is equal to or higher than the predetermined temperature T1 and thus the temperature of the evaporating portion 2 is still high enough to generate steam, in the manner described above.

That is, the determination process that determines whether the open circuit voltage (OCV) of the stack 12 increases while the raw material water is temporarily fed to the evaporating portion 2 is executed. In the determination process, if the open circuit voltage (OCV) of the stack 12 has increased, the steam generation system 2X constituted of the evaporating portion 2, the water feed passage 8, etc. is determined as being in a normal condition, and therefore the igniter 35 is activated for ignition. That is, at this time, the pump 60 is driven to feed the fuel to the combustion portion 105 via the evaporating portion 2, the reforming portion 3, and the anodes 10, and the cathode pump 71 is driven to deliver the cathode gas (air) into the power generator module 18, and then the igniter 35 is activated for ignition, so that combustion flames are produced in the combustion portion 105. In this way, the inside of the power generator module 18 is heated, and thus the system restart process in which the evaporating portion 2, the reforming portion 3, and the stack 12 are heated is executed. In contrast, if it is determined in the determination process that the open circuit voltage (OCV) of the stack 12 has not increased, it is determined that the steam generation system 2X constituted of the evaporating portion 2, the water feed passage 8, etc. is highly likely to be in an abnormal condition, and therefore the controller 100 activates the alarm 102 for alarming.

(Others)

The invention has been described with reference to the foregoing example embodiments and application form and the respective drawings for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art. For example, the heating portion 40 is provided at the tank 4 in the foregoing example embodiments, the invention is not limited to this. That is, for example, the heating portion 40 may alternatively be provided at the tank 42. Further, the heating portion 40 may be removed if appropriate. The fuel cells 1 may alternatively be molten carbonate fuel cells or phosphoric-acid fuel cells, for example. The heating portion 40 may be removed if appropriate. The fuel cells 1 may be solid polymer fuel cells provided that the stack can be started in a state where the power generation of the stack is suspended but the temperature of the evaporation is still high enough to generate steam. The fuel may be manufactured gas, LPG, biogas, gasoline, heating oil, alcohol, or the like. While the stack 12, the reforming portion 3, and the evaporating portion 2 are disposed in the power generator module 18 in the example illustrated in FIG. 5, the evaporating portion 2 may be arranged outside the power generator module 18 or apart from the power generator module 18 or may be arranged adjacent to the thermal insulation wall 19 of the power generator module 18, provided that the temperature of the evaporating portion 2 can made be high enough to generate steam. The following are examples of technical subject matters that are conceptually extracted from the technologies described above with reference to the example embodiments, application form, modification examples, etc.

(Additional Remark 1)

A fuel cell system state determination method (fuel cell system diagnosis method) diagnoses the state of a fuel cell system that is provided with: a stack of fuel cells each having an anode to which an anode fluid is fed and a cathode to which a cathode fluid is fed; a steam generation system that is provided with an evaporating portion for generating a steam by evaporating a raw material water and a water feed passage having a water deliverer for delivering the raw material water to the evaporating portion; and a reforming portion that produces the anode fluid by performing steam-reforming on a fuel using the steam generated by the evaporating portion, wherein a process for discontinuing power generation of the stack is executed, and then a determination process is executed which determines whether an open circuit voltage of the stack increases in a state where the raw material water is fed (or temporarily fed) to the evaporating portion while a temperature of the evaporating portion is still high enough to generate the steam, and the steam generation system is determined as being in a normal condition if the open circuit voltage of the stack has increased or is on an increase. According to the fuel cell system state determination method (fuel cell system diagnosis method) described above, it is possible to check the steam generation system each time the power generation is discontinued.

(Additional Remark 2)

A fuel cell system operation discontinuance method discontinues power generation of a fuel cell system that is provided with: a stack of fuel cells each having an anode to which an anode fluid is fed and a cathode to which a cathode fluid is fed; a steam generation system that is provided with an evaporating portion for generating a steam by evaporating a raw material water and a water feed passage having a water deliverer for delivering the raw material water to the evaporating portion; and a reforming portion that produces the anode fluid by performing steam-reforming on a fuel using the steam generated by the evaporating portion, wherein a process for discontinuing power generation of the stack is executed, and then a determination process is executed which determines whether an open circuit voltage of the stack increases in a state where the raw material water is fed (or temporarily fed) to the evaporating portion while a temperature of the evaporating portion is still high enough to generate the steam, and the steam generation system is determined as being in a normal condition if the open circuit voltage of the stack has increased or is on an increase. According to the fuel cell system operation discontinuance method described above, it is possible to check the steam generation system each time the power generation is discontinued.

(Additional Remark 3)

A fuel cell system operation start method starts power generation of a fuel cell system that is provided with: a stack of fuel cells each having an anode to which an anode fluid is fed and a cathode to which a cathode fluid is fed; a steam generation system that is provided with an evaporating portion for generating a steam by evaporating a raw material water and a water feed passage having a water deliverer for delivering the raw material water to the evaporating portion; and a reforming portion that produces the anode fluid by performing steam-reforming on a fuel using the steam generated by the evaporating portion, wherein a determination process is executed which determines whether an open circuit voltage of the stack increases in a state where the raw material water is fed (or temporarily fed) to the evaporating portion while the power generation of the stack is suspended but a temperature of the evaporating portion is still high enough to generate the steam, and if the open circuit voltage of the stack has increased or is on an increase, the steam generation function of the steam generation system is determined as being normal, and then the fuel cell system is started up. According to the fuel cell, system operation start method described above, it is possible to check the steam generation system each time the fuel cell system is started up, as long as the evaporating portion generates steam.

The invention claimed is:

1. A fuel cell system comprising:
a stack of fuel cells each having an anode to which an anode fluid is fed and a cathode to which a cathode fluid is fed;
a steam generation system that is provided with an evaporating portion for generating a steam by evaporating a water and a water feed passage having a water deliverer for delivering the water to the evaporating portion;
a reforming portion that produces the anode fluid by performing steam-reforming on a fuel using the steam generated by the evaporating portion; and
a controller, wherein
the controller is programmed to execute a determination process that determines whether an open circuit voltage of the stack increases in a state where the water is fed to the evaporating portion while power generation of the stack is suspended but a temperature of the evaporating portion is a reference temperature being capable of generating the steam, and if it is determined in the determination process that the open circuit voltage of the stack has increased or is on an increase, the controller is programmed to determine the steam generation system as being in a normal condition.

2. The fuel cell system according to claim 1, wherein the controller is programmed to execute the determination process while feeding the cathode fluid to the cathodes in the stack.

3. The fuel cell system according to claim 1, wherein the controller is programmed to restart the fuel cell system after the steam generation system is determined as being in the normal condition in the determination process.

4. The fuel cell system according to claim 1, wherein the controller is programmed to execute the determination process when the temperature of the evaporating portion is the reference temperature being capable of generating the steam after a command for discontinuing power generation of the fuel cell system is output.

5. The fuel cell system according to claim 1, wherein, in the determination process, the open circuit voltage of the stack is determined as having increased or as being on an increase if a rate of increase in the open circuit voltage of the stack is equal to or higher than a predetermined value.

6. The fuel cell system according to claim 1, wherein, in the determination process, the higher the temperature of the evaporating portion is, the larger an amount of the water to be fed to the evaporating portion is made.

7. A fuel cell system diagnosis method for diagnosing a fuel cell system that is provided with: a stack of fuel cells each having an anode to which an anode fluid is fed and a cathode to which a cathode fluid is fed; a steam generation system that is provided with an evaporating portion that generates a steam by evaporating a water and a water feed passage having a water deliverer delivering the water to the evaporating portion; and a reforming portion that produces the anode fluid by performing steam-reforming on a fuel using the steam generated by the evaporating portion, the fuel cell system diagnosis method comprising:
executing a discontinuation process discontinuing power generation of the stack by reducing an amount of the fuel supplied to the reforming portion to a predetermined value or less; and
executing, after the discontinuation process, a determination process that determines whether an open circuit voltage of the stack increases in a state where the water is fed to the evaporating portion while a temperature of the evaporating portion is a reference temperature being capable of generating the steam; and determining the steam generation system as being in a normal condition if it is determined in the determination process that the open circuit voltage of the stack has increased or is on an increase.

8. A fuel cell system diagnosis method for diagnosing a fuel cell system according to claim 7, wherein the discontinuation process is executed by discontinuing of supplying the fuel to the reforming portion.

9. A fuel cell system diagnosis method for diagnosing a fuel cell system according to claim 7, wherein the determination process is executed when the temperature of the evaporating portion is equal to or greater than 80° C.

\* \* \* \* \*